US011759902B2

(12) United States Patent
Hughes, Jr.

(10) Patent No.: US 11,759,902 B2
(45) Date of Patent: Sep. 19, 2023

(54) WORKPIECE ADAPTER SYSTEM FOR ROTARY MACHINE

(71) Applicant: Robert Kyle Hughes, Jr., Johnson City, TN (US)

(72) Inventor: Robert Kyle Hughes, Jr., Johnson City, TN (US)

( * ) Notice: Subject to any disclaimer, the term of this patent is extended or adjusted under 35 U.S.C. 154(b) by 58 days.

(21) Appl. No.: 17/120,997

(22) Filed: Dec. 14, 2020

(65) Prior Publication Data
US 2021/0178538 A1 Jun. 17, 2021

Related U.S. Application Data

(60) Provisional application No. 62/947,326, filed on Dec. 12, 2019.

(51) Int. Cl.
*B23Q 3/12* (2006.01)

(52) U.S. Cl.
CPC ...................... *B23Q 3/12* (2013.01)

(58) Field of Classification Search
CPC .... B23B 3/08; B23B 3/12; B23B 5/08; B23B 5/36; B23B 23/005; B23B 23/025; B23B 23/045; B23B 33/00; B23B 2233/24; B23B 2233/28; B23B 2231/04; B23Q 3/12
See application file for complete search history.

(56) References Cited

U.S. PATENT DOCUMENTS

| | | | | |
|---|---|---|---|---|
| 2,046,238 A * | 6/1936 | Balsiger | ................. | B23B 33/00 82/165 |
| 2,991,669 A * | 7/1961 | Stock | ...................... | B25B 5/003 269/45 |
| 3,392,611 A * | 7/1968 | Carroll | .................... | B23Q 5/348 82/135 |
| 3,499,178 A * | 3/1970 | Blake | ...................... | B23B 5/168 470/58 |
| 5,347,897 A * | 9/1994 | Rouleau | .................. | B25B 5/147 82/127 |
| 5,993,296 A * | 11/1999 | Rogers | .................... | B23B 31/08 451/49 |
| 6,145,419 A * | 11/2000 | Laycock | .................. | F16D 3/79 464/95 |
| 11,224,919 B2 * | 1/2022 | Schelling | ............... | B23Q 3/183 |

FOREIGN PATENT DOCUMENTS

FR 2454862 A1 * 11/1980 ............. B23B 33/00
WO WO-2018164244 A1 * 9/2018 ............... B23B 5/08

* cited by examiner

*Primary Examiner* — Sunil K Singh
*Assistant Examiner* — Reinaldo A Vargas Del Rio
(74) *Attorney, Agent, or Firm* — Blanchard Horton PLLC; Jacob G. Horton; Jonathan M. Blanchard (57) ABSTRACT

A workpiece adapter system to support a workpiece rotated by a rotary machine, the system including a first drive member having a proximal end configured to be secured in a chuck of a rotary machine, at least one workpiece adapter configured to secure at least a portion of an end of a workpiece in a central opening of the workpiece adapter, an adapter mount configured to be connected to the at least one workpiece adapter, and a universal joint assembly arranged between the first drive member and the adapter mount, the universal joint assembly comprising a first fork member coupled to the first drive member, and a second fork member coupled to the adapter mount. An adapter ring may be provided to rotatably support a workpiece being machined.

17 Claims, 7 Drawing Sheets

WORKPIECE ADAPTER SYSTEM FOR ROTARY MACHINE

CROSS-REFERENCE TO RELATED APPLICATIONS

This application claims the benefit of U.S. Provisional Patent Application No. 62/947,326, filed on Dec. 12, 2019, and of U.S. Provisional Patent Application No. 62/947,325, filed on Dec. 12, 2019, the entireties of both of which are incorporated herein by reference.

FIELD OF INVENTION

The present general inventive concept relates to a rotary machine system, and, more particularly, to a workpiece adapter system for incorporation into a rotary machine system.

BACKGROUND

Rotary machines typically use one of two ways to rotate a workpiece that is being tooled on the rotary machine. The first is using a 3 or 4 jaw lathe chuck, whereby the workpiece is mounted directly into the chuck on one end, and the other end is supported by fixed height rollers that the workpiece will rotate on. The second is to place the workpiece onto motorized rollers. As the rollers turn, the workpiece rotates. In both of these conventional cases the supports are usually required to be placed at the ends of the workpiece in order to limit the amount the ends of the workpiece wobble off axis during rotation.

For very large workpieces a chuck and bearing system of the rotary machine must be large enough to handle the increased size and weight of the workpiece, thereby increasing the rotational mass the system must drive and requiring more powerful drive motors. Also, non-round workpieces present problems with systems that clamp the workpiece directly to the chuck. One is the problem of simply trying to clamp the workpiece to the chuck. Another is the difficulty of placing the workpiece in the system and chuck. Thus, it would be desirable to have a system that more easily and conveniently accommodates large and/or non-round workpieces.

BRIEF SUMMARY

According to various example embodiments of the present general inventive concept, a system is provided to more conveniently and efficiently rotate, with a high degree of accuracy, irregularly shaped and/or large workpieces in a rotary machine.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a workpiece adapter system to support a workpiece rotated by a rotary machine, the system including a first drive member having a proximal end configured to be secured in a chuck of a rotary machine, at least one workpiece adapter configured to secure at least a portion of an end of a workpiece in a central opening of the workpiece adapter, an adapter mount configured to be connected to the at least one workpiece adapter, and a universal joint assembly arranged between the first drive member and the adapter mount, the universal joint assembly comprising a first fork member coupled to the first drive member, and a second fork member coupled to the adapter mount.

The foregoing and/or other aspects and advantages of the present general inventive concept may also be achieved by providing an adapter ring to support a workpiece being rotated by a rotary machine, including first and second plates that are circular and have a common diameter, at least one middle portion connecting and maintaining a substantially uniform distance between the first and second plates, and a central opening substantially centered on a longitudinal axis of the adapter ring and sized to pass a workpiece therethrough.

The foregoing and/or other aspects and advantages of the present general inventive concept may also be achieved by providing a Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein.

Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As previously noted, conventional rotary machines typically use one of two ways to rotate the workpiece. The first is a 3 or 4 jaw lathe chuck. The workpiece is clamped directly into the chuck on one end, and the other end is supported by fixed height rollers that the workpiece will rotate upon. The second is to place the workpiece onto motorized rollers. As the rollers turn the work piece rotates. In the first case the workpiece is clamped directly into a 3 or 4 jaw lathe chuck. The chuck is typically provided at a fixed height. A series of support rollers are individually raised or lowered until the workpiece is level. Whenever the size of the workpiece is changed all supporting rollers must be adjusted to a new height. This is a fairly time intensive job. Being clamped directly in the chuck does ensure the work piece is rotating in an angular accurate manner. For very large work pieces such a 12" and greater pipe the chuck and bearing system must be large enough to handle the size and weight of the work piece thereby increasing the rotational mass the system must drive and requiring more powerful drive motors. This is one or the problems corrected by example embodiments of the present general inventive concept. Another major issue is a result of the fact that the workpiece is rigidly clamped in the chuck. If the piece is bent and of sufficient length, it will generally try to move in the chuck during rotation. Also, because of the weight of the part it will usually remain in contact with the support rollers, aggravating this problem. Eventually the part may work itself loose in the chuck. Non-round shapes present a challenging problem with a system that clamps the workpiece directly into the chuck. The obvious one is the issues that pop up simply trying to clamp the workpiece in the chuck itself. For instance, an L angle workpiece is particularly troublesome because the usual solution of using stock size spacers will not work. Generally, in this scenario, custom machined blocks are fabricated. This is problematic at least because not all hot rolled L angle is the same specification for a given size. This usually depends on the manufacture of the material. Therefore, you may need many sizes of blocks to accommodate the same size material.

Another difficulty is accurately lifting the workpiece and sliding it into the chuck. Large parts are generally lifted by a forklift and shifted into the chuck. This typically requires at least two people, one to operate the lift and another to guide the part and tighten the chuck. Some current machines use a system in which the pipe is raised by special shifting rollers that allow the pipe to be slid into the chuck and clamped. They are independent from the support rollers that allow the pipe to rotate. This is a complex and expensive method. Additionally, if the workpiece is not round, such as a channel shape, other problems arise because it is not possible to use shifting rollers.

As previously noted, when processing workpieces such as, for example, round pipe, some machines use motorized rollers to effect rotation. A problem arises when the workpiece is not the correct diameter, or may be oblong. If the o.d. is not correct, compensation must be made to ensure the part accurately rotates 360 degrees, or the cut will not finish in the correct position. This kind of drive also makes doing non-round shapes difficult to process.

According to various example embodiments of the present general inventive concept, a system is provided to more conveniently and efficiently rotate, with a high degree of accuracy, irregularly shaped and/or large workpieces in a rotary machine. Various example embodiments of such a system may provide a universal joint and adapter mount configured to be coupled between a drive spindle and a workpiece, and a workpiece adapter to attach to the adapter mount to accommodate different shapes and sizes of workpieces. Various example embodiments may also include adapter rings to provide rotational support along a length of such workpieces without requiring motorized rollers. The various systems, sub-systems, devices, assemblies, etc., described herein according to various example embodiments of the present general inventive concept function as support and minimize sagging of a workpiece during operations performed on the workpiece, such as rotary cutting, marking, etc., as the workpiece is rotated by a rotary machine. The general term workpiece will be used herein to represent any of a variety of different pieces that may be rotated by a rotary machine to be machined or otherwise worked on in various operations such as those listed above. Various example embodiments of the present general inventive concept address the problems that occur when supporting non-round workpieces such as, for example, rectangular pieces, square tubes, structural shapes such as an L angle, channel, I-beam, polygon shaped tubes, custom welded structures, large and generally difficult to handle pieces, etc., during rotation.

Figure 1:
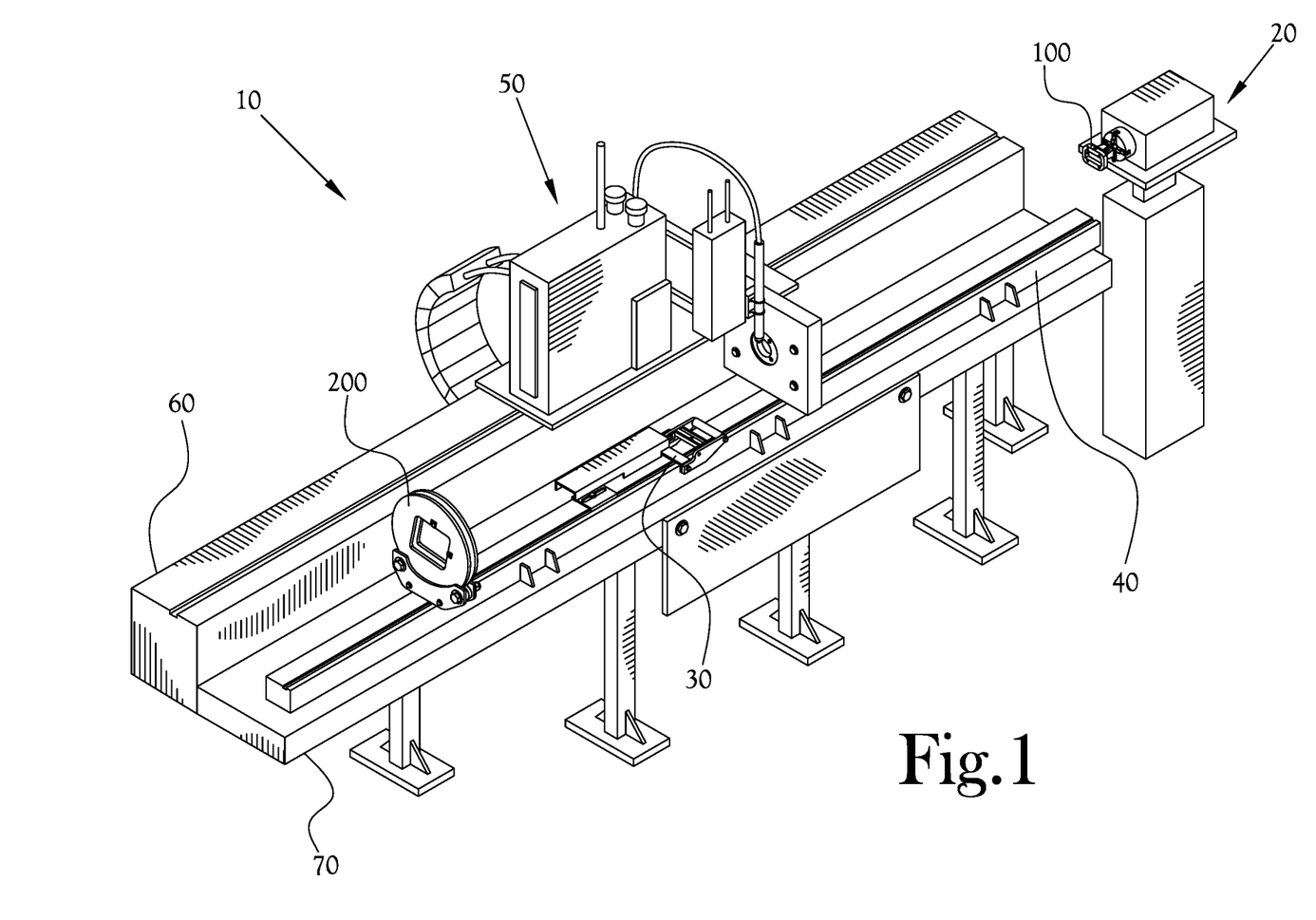
FIG. 1 is a perspective view of portions of a rotary machining system according to an example embodiment of the present general inventive concept.

FIG. 1 is a perspective view of portions of a rotary machining system according to an example embodiment of the present general inventive concept. Example embodiments of the rotary machining system 10 illustrated in FIG. 1 may include a rotary machine 20 that may be configured to be selectively raised and lowered to a desired height of the rotational axis. The lowering of the rotary machine 20 may be configured to be manual, automatic, or both. A general system base platform 70 may be provided with a work or support rail 40, such as a tube frame rail, on which various components such as a lifter device or support system 30 may be secured for various machining operations. The support system 30 may include a fixing block to be secured to the work rail 40, to which levers are rotatably attached which have a roller on distal ends thereof which can be lifted by a variable pressure device coupled to the levers, so that a support roller can be lifted and generally maintained at a desired height to support workpieces being machined in the rotary machining system. One or more adapter rings 200, which will be described in more detail herein, may be provided along the work rail 40 to rotatably support a workpiece being machined in the rotary machining system 10. An upper rail 60 may be provided to support a traveling head rotary cutter system 50 that can be used to stabilize workpieces while traveling back and forth on the upper rail 60 to perform machining operations such as cutting, marking, and so on. As illustrated in FIG. 1, a workpiece adapter system 100 may be provided to transfer rotational motion from the rotary machine 20 to a workpiece having one end secured in the workpiece adapter system, which will be described in more detail in FIGS. 2-3.

Figure 2:
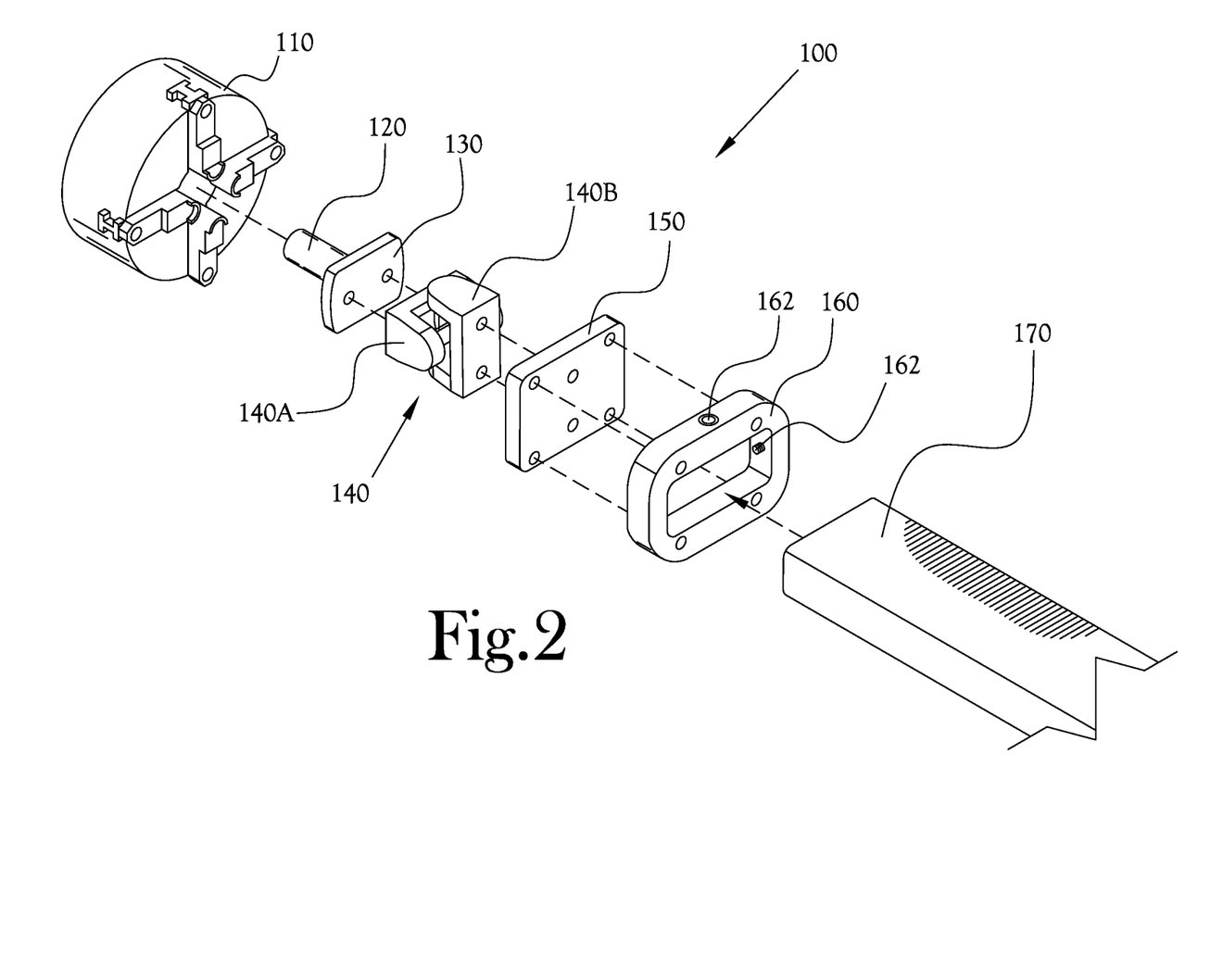
FIG. 2 illustrates an exploded view of a workpiece adapter system of the system illustrated in FIG. 1 according to an example embodiment of the present general inventive concept.
Figure 3:
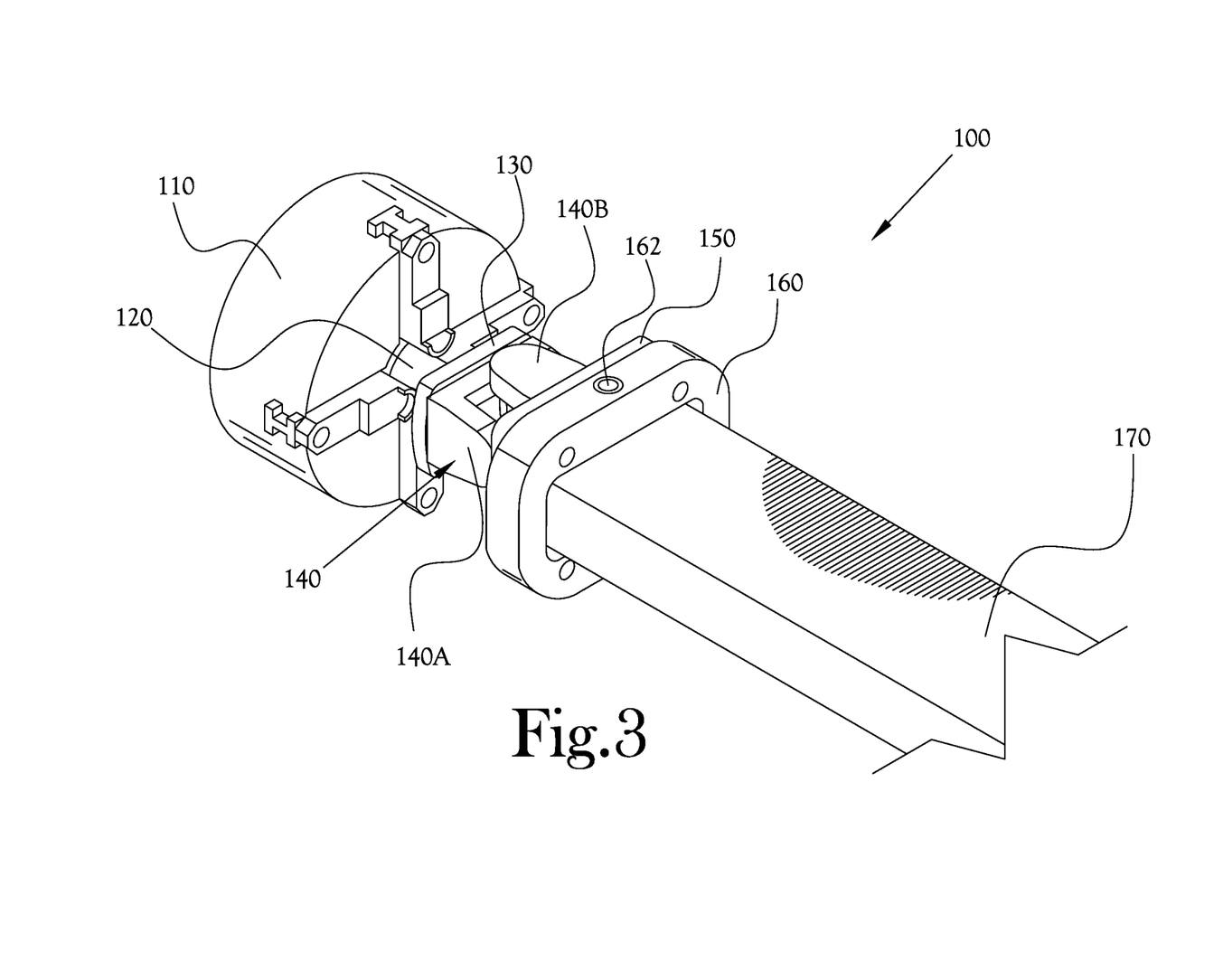
FIG. 3 illustrates an assembled view of the workpiece adapter system of FIG. 2.

FIG. 2 illustrates an exploded view of the workpiece adapter system 100 of the rotary machining system 10 illustrated in FIG. 1 according to an example embodiment of the present general inventive concept, and FIG. 3 illustrates an assembled view of the workpiece adapter system 100 of FIG. 2. The workpiece adapter system 100 functions to allow the chuck 110 of the rotary machine 20 be secured about a solid and regular first drive member 120, and have the rotational force transferred to the workpiece 170 without the problematic shape of the workpiece 170 having to be addressed by the chuck 110. As illustrated in FIG. 2, the first drive member 120 may have a generally cylindrical shape such that a proximal end of the first drive member 120 is received and secured in the chuck 110. In this example embodiment, a back surface of a mounting plate 130 is attached to the distal end of the first drive member 120, and a universal joint assembly 140 is mounted to the mounting plate 130. A first fork member 140A is mounted to a front surface of the mounting plate 130, and a second fork member 140B of the universal joint assembly 140 is attached to a back surface of an adapter mount 150. It will be understood by one skilled in the art that a host of different configurations of these and/or other components may be employed without departing from the scope of the present general inventive concept. For example, the mounting plate 130 may be formed integrally with the first drive member 120, or may be attached to the distal end of the first drive member by a variety of methods such as welding, bolting, etc. In various example embodiments, the distal end of the first drive member may be attached directly to the universal joint assembly 140 itself. In these drawings, the features of the universal joint assembly 140, including the first fork member 140A and second fork member 140B, are exaggerated for clarity and understanding, but it will be understood that the universal joint assembly may have a host of differently configured components without departing from the scope of the present general inventive concept.

As illustrated in FIG. 2, a workpiece adapter 160 is configured to be able to receive at least an end portion of a workpiece 170 in an open central portion thereof, and secure it there with securing members 162 such as, for example set screws, passing through adjacent side walls of the workpiece adapter 160 to contact the surface of the workpiece 170. In the example embodiment illustrated in FIGS. 2-3, a single set screw 162 is shown as passing through top and one adjacent side of the workpiece adapter 160, but different quantities and combinations may be used in various other example embodiments. In various example embodiments the set screws 162 may be provided with plates or other surfaces or grips that may protect the surface of the workpiece 170 when clamped in the workpiece adapter 160. The workpiece adapter 160 in FIG. 2 has a central opening sized for the 2×4 inch configuration of the workpiece 170, but various example embodiments of such a machining system may have a plurality of different workpiece adapters configured for different sizes and/or configurations of workpieces. Also, the workpiece adapter 160 of FIG. 2 may be used for smaller rectangular workpieces, such as a 1×2 inch rectangular workpiece, by adding one or more spacers in between some sides of the workpiece 170 and the central opening of the workpiece adapter 160 such that the rotational axis of the workpiece 170 is still substantially centered on that of the workpiece adapter 160. As illustrated in FIG. 2, the workpiece adapter 160 is configured to be mounted to the adapter mount 150 that is attached to the universal joint assembly 140. Therefore, the workpiece adapter system 100 has a tremendous benefit in that different workpiece adapters 160 can be easily and quickly swapped out for different types of workpieces, all while maintaining the assembly between the adapter mount 150 and the chuck 110. In the example embodiment illustrated in FIG. 2, the various components are illustrated with simple openings and through holes with connection lines to indicate the placement of adhering members that have been omitted for the sake of clarity. For example, the workpiece adapter 160 has four through holes that correspond to four threaded receiving holes formed in the adapter mount 150 so that four bolts can be extended through the respective through holes of the workpiece adapter 160 and threaded into the corresponding receiving holes in the adapter mount 150. Various example embodiments may provide components that are secured to one another in a variety of different ways, such as welding, without departing from the scope of the present general inventive concept. However, being able to quickly disconnect the workpiece adapter 160 from the adapter mount 150 is very beneficial to the efficiency of the system. FIG. 3 illustrates the workpiece adapter 160 secured to the adapter mount 150, and with the end of the workpiece 170 secured inside. With such an assembly, the rotary machine 20 can operate without any irregular connections inside the chuck 110, and the rotation is efficiently translated to the workpiece 170.

Figure 4:
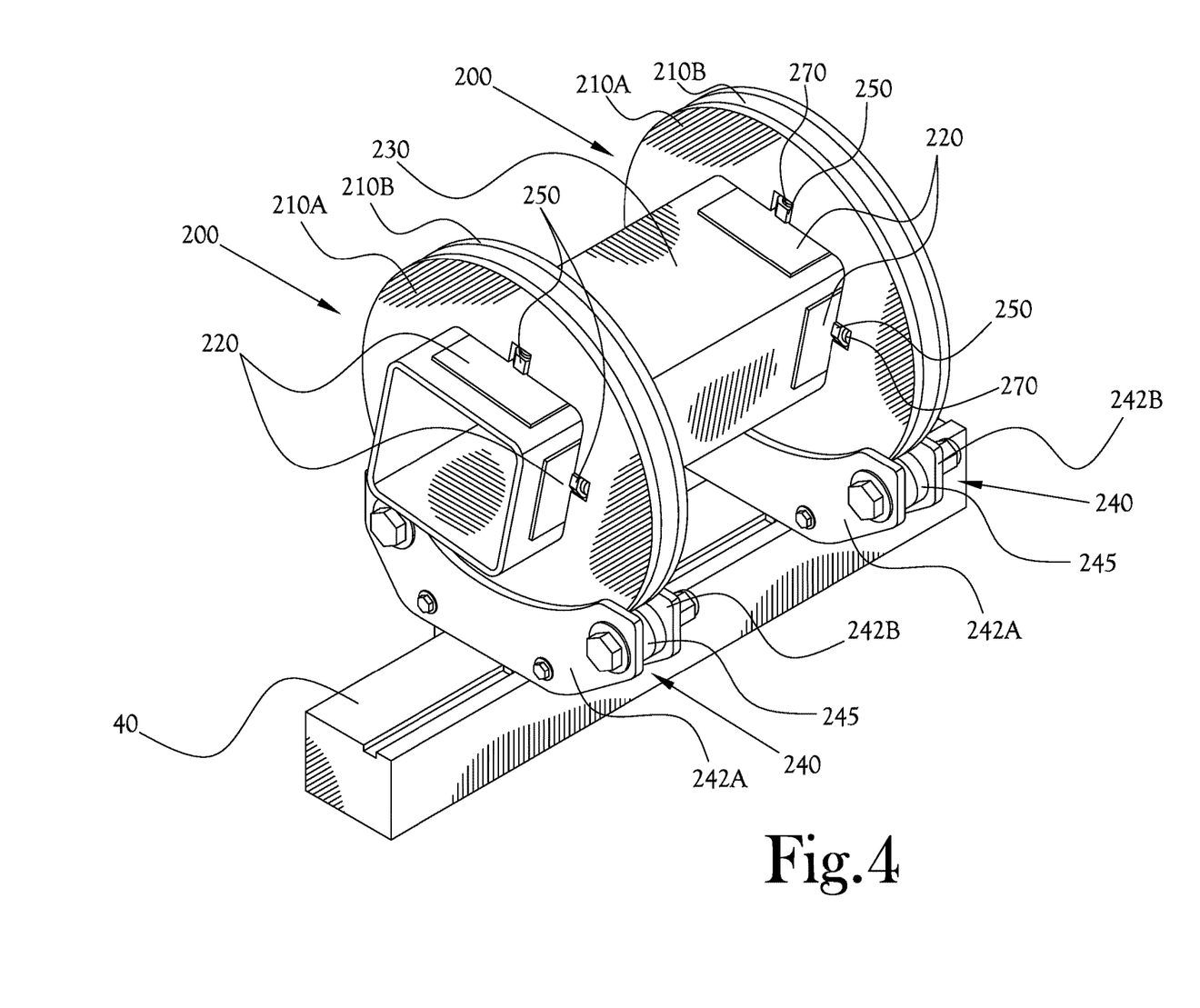
FIG. 4 illustrates a perspective view of adapter rings that may be used in the system of FIG. 1 according to an example embodiment of the present general inventive concept.
Figure 5:
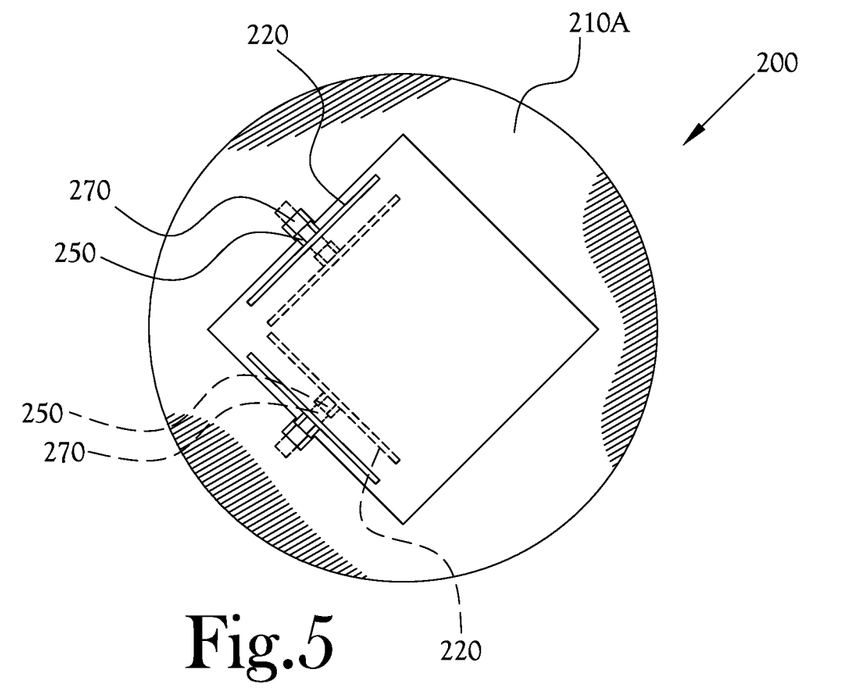
FIG. 5 illustrates an end view of one of the adapter rings of FIG. 4.
Figure 6:
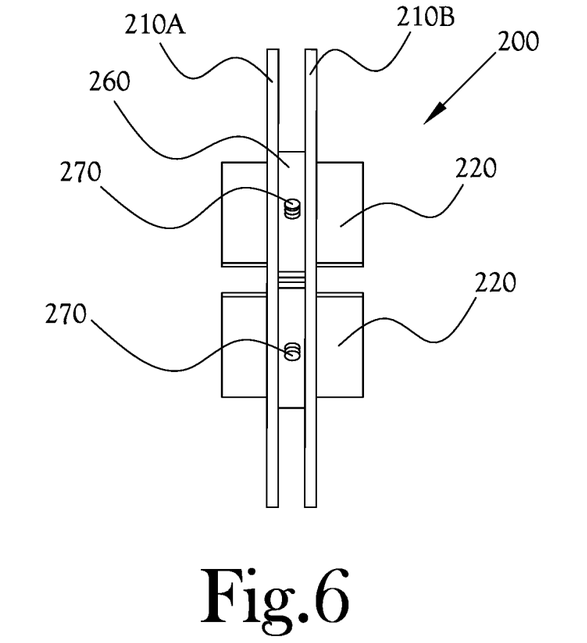
FIG. 6 illustrates a side view of the adapter ring of FIG. 5.

FIG. 4 illustrates a perspective view of adapter rings 200 that may be used in the system 10 of FIG. 1 according to an example embodiment of the present general inventive concept. The adapter rings 200 are configured to provide rotational support for a workpiece at distances away from the rotary machine 20, so as to prevent unwanted affects such as wobble, sagging, etc., which can affect the machining operations. In FIG. 4, two adapter rings 200 are illustrated as providing support for a length of a workpiece 230, which is substantially square, such that a desired rotational axis of the workpiece 230 is maintained in a rotational machining operation. Each of the adapter rings 200 includes a first plate 210A and a second plate 210B that are circular and have a common diameter, and which are connected by a middle portion such that a substantially uniform distance is maintained between the first and second plates 210A, 210B, and such that the plates are aligned about a rotational axis. A central opening is substantially centered on the longitudinal axis, or rotational axis, of the adapter rings 200, and sized to receive the workpiece 230 therethrough. As with the workpiece adapters 160 previously discussed, the central opening of the adapter rings 200 may be configured for a certain size and/or configuration of workpiece, but may also be adjusted down to fit smaller workpieces. In various example embodiments the adapter rings 200 may be provided with extending members such as set screws, with or without securing plates at the end, to extend through the middle portion and into the central opening of the adapter ring 200. In the example embodiment illustrated in FIG. 4, the central opening of the adapter ring 200 has four substantially flat sides to correspond to the workpiece 230 passed therethrough. As seen in FIG. 5, which illustrates an end view of one of the adapter rings 200 of FIG. 4, and FIG. 6, which illustrates a side view of the adapter ring 200 of FIG. 5, two adjacent sides of the central opening are provided with threaded members 270 that extend radially through the middle portion 260 between the plates 210A, 210B and into the central opening to secure the workpiece 230 in the adapter ring 200. In this example embodiment, each of the threaded members 270 has a securing plate 220 provided at the end so that rotation of the threaded members 270 may move securing plate 220 further into the central opening of the adapter ring 200, or back toward the edge of the central opening. In this example embodiment, a rotating nut 250 is configured such that rotation of the rotating nut 250, which may be captured in a recess of the plates 210A-210B either adjacent to, or away from, the central opening, will cause the in and out movement of the threaded member 270 and securing plate 220. In various example embodiments differently configured components may be used to move the securing plates 220 and/or securing members. In this example embodiment the threaded members 270 and securing plates 220 are provided at two adjacent sides of the central opening, and may be used with spacers as discussed before in regard to the workpiece adapters 160 to secure smaller workpieces therein. In other various example embodiments such securing members may be provided at three or four sides of the central opening.

As illustrated in FIG. 4, each of the adapter rings 200 may be provided with a corresponding roller cradle 240 which rotatably supports the adapter rings 200. The roller cradles 240 may be configured to be secured to the work rail 40 as illustrated in FIG. 4, and may include two plates 240A,240B with a plurality of rollers 245 therebetween. The rollers 245 may be configured such that the outer perimeter of the adapter ring 200 can be rotatably supported such that the adapter ring 200 maintains the rotational axis of the workpiece 230 while rotating. In this example embodiment the plates 240A,240B are configured to extend higher than the portion of the adapter ring 200 perimeter being supported on the rollers 245, to aid in maintaining the position of the adapter ring 200 in the cradle 240. In various example embodiments the rollers 245 may be rotatably mounted on a bolt forming an axle body, and may have a raised midsection configured to extend in between the adapter ring plates 210A,210B to aid in keeping the adapter rings 200 centered during rotation. Various example embodiments may provide a host of other configurations, such as a cradle formed by rollers without outer plates on either side. In such example embodiments, rollers may be individually mounted on work rails, and configured to correspond to the outer radius of the adapter rings 200 to rotatably support the adapter rings 200 such that the rotational axis of the adapter rings 200 is maintained.

Figure 7:
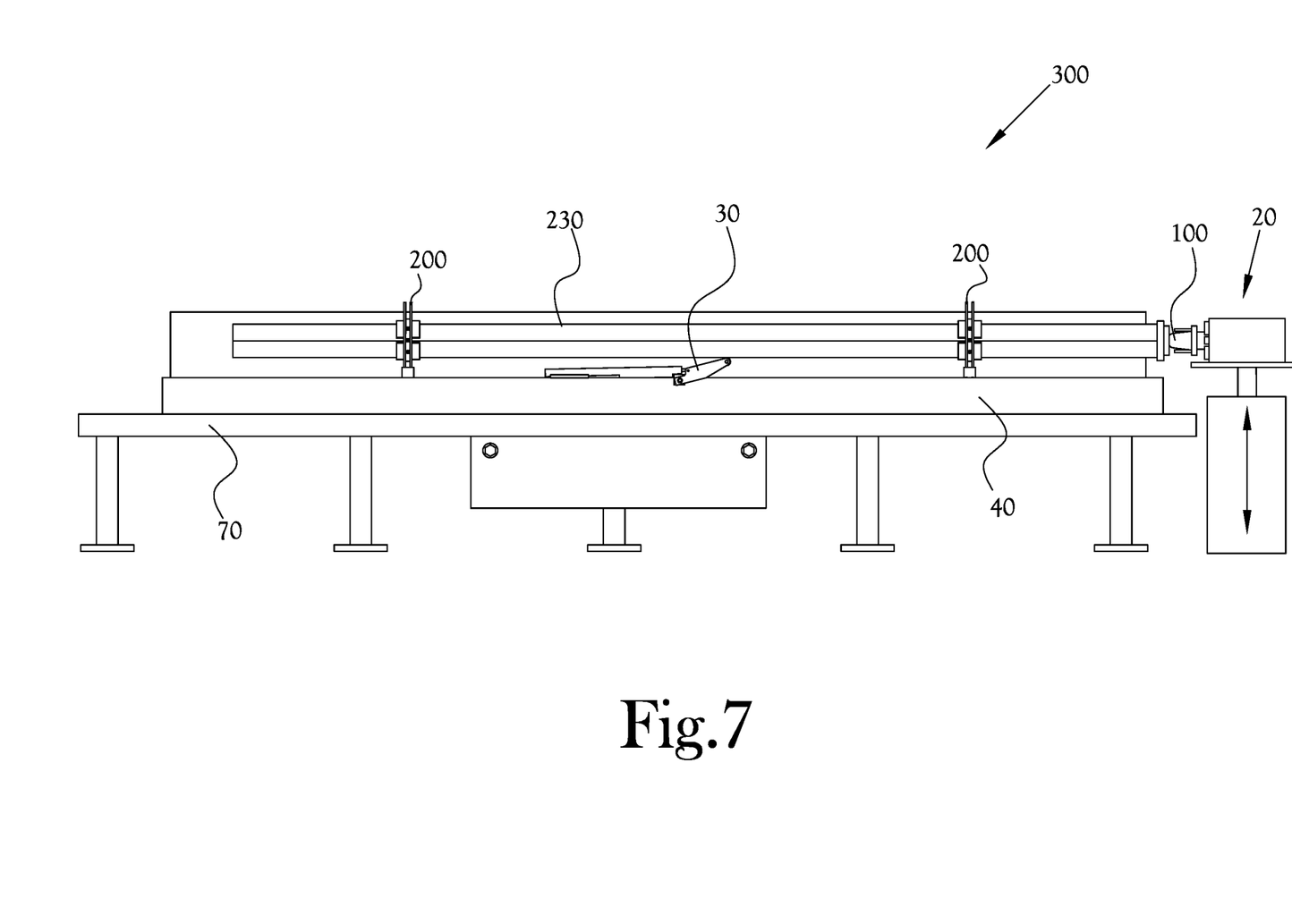
FIG. 7 illustrates a side view of a rotary machining system according to an example embodiment of the present general inventive concept.

FIG. 7 illustrates a side view of a rotary machining system according to an example embodiment of the present general inventive concept. In this example embodiment the rotary machining system 300 includes the rotary machine 20 that is configured to be moved up and down such that the chuck of the rotary machine is at a desired height. The workpiece adapter system 100 is secured in the chuck of the rotary machine 20, and has an end of the workpiece 230 secured therein. Two adapter rings 200 are provided at two different positions of the workpiece 230 to provide rotational support, and the support system 30 is also provided between the two adapter rings to provide support for the rotating workpiece 230 in between the adapter rings 200, with the roller of the support system 30 being able to move up and down as controlled by a variable pressure member to maintain contact with the square workpiece 230 during all points of rotation. Thus, as can be seen in FIG. 7, the workpiece 230 can be supported at various points along its length during a rotating operation so as to prevent sagging, wobbling, etc.

Figure 8:
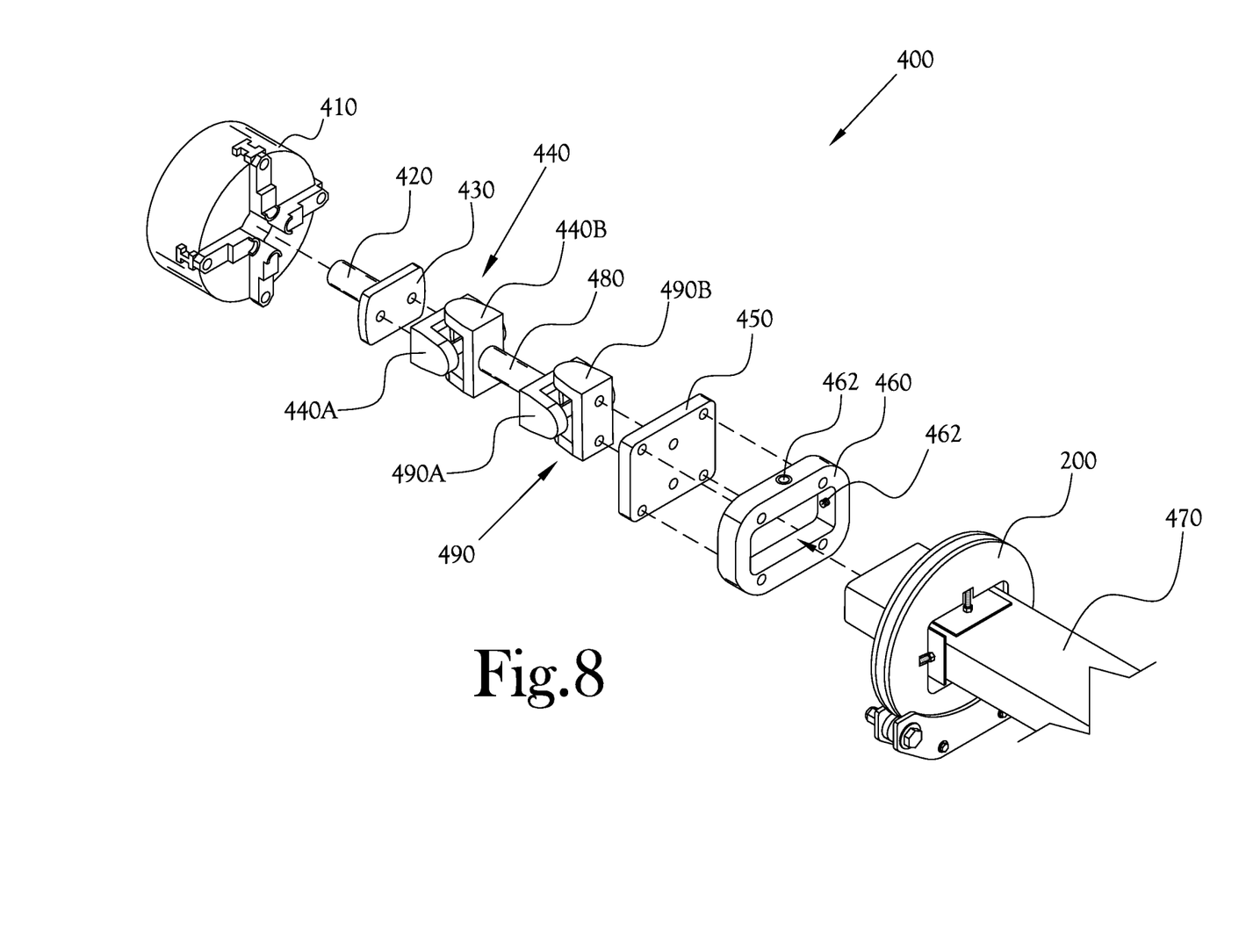
FIG. 8 illustrates an exploded view of a workpiece adapter system according to another example embodiment of the present general inventive concept.

Various example embodiments of the present general inventive concept may be more situated for situations in which a workpiece is extremely heavy, and therefore may put unwanted levels of stress on the chuck of the rotatory machine even with some embodiments of the yoke described herein. FIG. 8 illustrates an exploded view of a workpiece adapter system according to another example embodiment of the present general inventive concept, in which a double universal joint, or universal joint assembly, is employed. In various example embodiments, as seen in FIG. 8, an adapter ring 200 may be positioned closer to the rotary machine end of the workpiece to further aid in supporting the weight of the workpiece. The workpiece adapter system 400 is similar to the system 100 illustrated in FIGS. 2-3, having a chuck 410, first drive member 420, mounting plate 430, adapter mount 450, and workpiece adapter 460 with setting members 462. However, in the example embodiment illustrated in FIG. 8, a double universal joint assembly has been provided between the mounting plate 430 and the workpiece adapter. In this example embodiment the double universal joint universal joint assembly includes a first universal joint 440, having first and second fork members 440A,440B, and a second universal joint 490, having first and second fork member 490A,490B. A drive shaft, or second drive member 480, is arranged between the first universal joint 330 and the second universal joint 490. As illustrated in FIG. 8, in this example embodiment the first fork member 440A is attached to the mounting plate 430, the second fork member 440B is attached to a first end of the second drive member 480, the first fork member 490A is attached to a second end of the second drive member 480, and the second fork member 490B is attached to the back of the adapter mount 450. An adapter ring 400 is arranged proximal the end of the workpiece 470 that is to be secured in the workpiece adapter 460 to provide rotational support for the workpiece 470. Such, in situations in which a workpiece is especially heavy, support may be provided to the workpiece in close proximity to the yoke assembly, and the additional drive shaft 480 is available to protect the chuck 410 from increased forces caused by the heavy workpiece. In various example embodiments the length of the second drive member 480 may be at least as long as the radius of the adapter ring 200. In various example embodiments the length of the second drive member 480 may be at least as long as a distance between the rotational axis of the adapter ring 200 and a lowest rotational axis made possible by lowering the chuck 410 in the machining system. In various example embodiments the second drive member 480 may be positioned downstream of the double universal joint, so as to be between the double universal joint and the adapter mount 450. It is understood that various other universal joint assemblies and/or components, other than or in combination with those illustrated in FIG. 8, may be employed without departing from the scope of the present general inventive concept.

According to various example embodiments of the present general inventive concept, a system is provided more conveniently and efficiently rotate, with a high degree of accuracy, irregularly shaped workpieces in a rotary machine. The workpiece rotation system according to the present general inventive concept may be incorporated into an existing rotary machine, such as rotary cutting and marking machines. Example embodiments of the present general inventive concept address several issues that are problematic with conventional systems. Among them are the problems that typically occur when trying to accurately rotate round workpieces that are not dimensionally correct, or are out of round. Also among such problems are the issues associated with handling non-round workpieces such as rectangular pieces, square tubes, structural shapes such as L angle, channel, I-beam, polygon shaped tubes, and custom welded structures during rotation. Various other issues were also discovered to have been improved upon, compared with conventional systems, when using implementations of the present general inventive concept.

Various example embodiments of the present general inventive concept solve the previously discussed and other problems inherent to the conventional rotary machines and systems. Various example embodiments use support rollers that do not need to be adjusted vertically to accommodate different workpiece sizes. In various example embodiments the workpiece does not clamp into the chuck directly. The chuck simply drives a yoke, described herein, therefore making the chuck's physical size irrelevant. In the single u-joint and most basic configuration, example embodiments of the present general inventive concept utilize a yoke with a single universal joint and a standard adapter mount. Simple machined workpiece adapters are attached to this mount in order to handle different shapes and sizes. The U-joint allows the work piece to wobble without shifting in the chuck, thus preventing the loosening effect. The drive spindle (chuck) adjusts vertically, either manually or automatically, in order to level the work piece thereby eliminating the need to adjust each individual roller.

The workpiece adapter described herein attaches to the yoke plate to accommodate different shapes and sizes of workpieces. Various example embodiments use two set screws that are 90 degrees apart from each other to make contact with the work piece when tightening. The workpiece adapter is machined to accommodate the largest part compatible with that adapter. As an example, an adapter made for a 2×3" rectangular tube would be machined with two sides perpendicular and at the correct location to axially center the part. The other two sides may be machined with slightly more offset to allow for over size parts. If a smaller part, such as 1×2" was to be installed, then simple 0.5" spacers can be placed into the adapter behind the part to position the tube so as to be axially centered. In various example embodiments the other end of the workpiece may be supported by rings that ride on fixed rollers. These rings may be made to fit a particular size and shape of workpiece. However, some rings, such as those used for square and rectangular parts, can be fitted with adapter plates to allow the ring to more affordably handle smaller parts. Because of the unique 45 degree aligned hole pattern on the side of the rings and in the adapter plates in some example embodiments, the number of adapters required to handle different sized parts is greatly reduced.

As previously noted, for very large workpieces the chuck and bearing system must be large enough to handle the size and weight of the workpiece, with enough load bearing strength to support the workpiece on one end. For very large pieces this becomes expensive very quickly. To address such problems, various example embodiments of the present general inventive concept may use two u-joints in a drive shaft type manner. Such a configuration is similar to the single u-joint system described above, but uses a shaft between the two u-joints in some example embodiments. This configuration may also use two or more adapter rings to support the workpiece. The ring on the drive shaft side mounts to the end of the workpiece and uses the same adapter plates as the above configuration to handle different size and shapes of workpieces, on the opposite side of the ring that the drive shaft attaches. The ring on the other end of the work piece may be substantially the same as the previously described configuration. With such a system, the workpiece is now solely supported by the rings and the size and load bearing capability of the drive spindle (chuck) can be greatly reduced.

As opposed to a driven roller machine, example embodiment systems according to the present general inventive concept have at least two distinct advantages. First, the workpiece cannot move along its longitudinal axis during rotation because the drive shaft will not allow it. A driven roller machine has no way to constrain the workpiece to a given location, and the workpiece can travel up the machine during machining operations, resulting in inaccurate cuts. The second advantage concerns handling pipes or other such pieces that may be over sized or out of round. When handling this kind of material the adapter rings are not used. The pipe simply rides on the rollers. Since the workpiece is being driven by a drive shaft, and not by the rollers, the angular accuracy is always maintained. As an example, on a roller driven machine, a piece of pipe that is over size will not rotate a full 360 degrees when commanded because its circumference is larger. A major advantage of the present general inventive concept has to do with out of round pipe. As the pipe rotates, the axis of the pipe will move up and down. If the pipe was clamped into a chuck this would cause binding problems. However, in systems according to the present general inventive concept the drive shaft simply moves up and down with the pipe, causing no bind.

Various example embodiments of the present general inventive concept may provide a workpiece adapter system to support a workpiece rotated by a rotary machine, the system including a first drive member having a proximal end configured to be secured in a chuck of a rotary machine, at least one workpiece adapter configured to secure at least a portion of an end of a workpiece in a central opening of the workpiece adapter, an adapter mount configured to be connected to the at least one workpiece adapter, and a universal joint assembly arranged between the first drive member and the adapter mount, the universal joint assembly comprising a first fork member coupled to the first drive member, and a second fork member coupled to the adapter mount. The system may further include a mounting plate arranged between the first drive member and the first fork member, such that a distal end of the first drive member is connected to a back side of the mounting plate, and a back surface of the first fork member is connected to a front side of the mounting plate. The mounting plate may be formed integrally with the first drive member. The at least one workpiece adapter may include a plurality of workpiece adapters respectively configured to secure differently shaped workpieces therein. The workpiece adapter may include threaded securing members configured to extend through at least two adjacent sides of the workpiece adapter, such that the securing members may be rotated to provide securing pressure to a workpiece secured therein. The adapter mount may be configured with a plurality of threaded receiving portions, and the at least one workpiece adapter may be configured with a corresponding plurality of through holes configured to respectively receive a plurality of threaded securing members to secure the at least one workpiece adapter to the adapter mount. The system may further include the rotary machine, and the rotary machine may be configured to be raised or lowered to a desired height to rotate the workpiece.

The system may further include one or more adapter rings to rotatably support the workpiece, each of the one or more adapter rings including first and second plates that are circular and have a common diameter, at least one middle portion connecting and maintaining a substantially uniform distance between the first and second plates, and a central opening substantially centered on a longitudinal axis of the adapter ring and sized to pass a workpiece therethrough. The central opening may be configured with a plurality of substantially flat sides configured to axially center the workpiece. The system may further include a plurality of threaded securing members passing respectively through the middle portion at least two adjacent sides of the central opening, and configured to set the workpiece in position. The system may further include a plurality of securing plates respectively attached to ends of the threaded securing members, and the securing plates may be configured to contact the surface of the workpiece to set the workpiece in position. The system may further include a plurality of rotating nuts respectively provided to the threaded securing members, and configured to be positioned in open positions in the first and second plates proximate the central opening such that a user can adjust the length of the threaded securing members extending into the central opening. The system may further include one or more roller cradles respectively provided for each of the one or more adapter rings, and each of the one or more roller cradles may be configured with at least two rollers positioned to correspond to an outer diameter of the adapter rings such that the adapter ring is rotatably supported on the rollers. Each of the one or more cradles may be configured with raised portions configured to maintain the outer diameter of the adapter ring therebetween while the adapter ring rotates on the rollers. Each of the one or more cradles may be configured to be secured to a base rail of a rotary machine system. The universal joint assembly may be configured as a double u-joint assembly including third and fourth fork members between the first and second fork members, and may further include a second drive member arranged between the third and fourth fork members. The system may further include a support system configured to be attached to a base rail of a rotary machine system and to support the workpiece being rotated, the support system including a base configured to be attached to the base rail, a lever member rotatably coupled to the base and having a roller member mounted to a distal end, and a variable pressure member connected to the lever member to rotate the lever member such that the roller member is moved to a desired height to support the workpiece during rotation.

Various example embodiments of the present general inventive concept may provide an adapter ring to support a workpiece being rotated by a rotary machine, including first and second plates that are circular and have a common diameter, at least one middle portion connecting and maintaining a substantially uniform distance between the first and second plates, and a central opening substantially centered on a longitudinal axis of the adapter ring and sized to pass a workpiece therethrough. The adapter ring may further include one or more roller cradles respectively provided for each of the one or more adapter rings, and each of the one or more roller cradles may be configured with at least two rollers positioned to correspond to an outer diameter of the adapter rings such that the adapter ring is rotatably supported on the rollers.

Various example embodiments of the present general inventive concept may provide a rotary machine system to rotate a workpiece during a machining operation, the system including a rotary machine having a chuck and configured to be raised and lowered to a desired height, a first drive member having a proximal end configured to be secured in the chuck, at least one workpiece adapter configured to secure at least a portion of an end of a workpiece in a central opening of the workpiece adapter, the workpiece adapter having a plurality of set screws respectively configured to pass through at least two adjacent sides of the workpiece adapter to set the workpiece so as to be axially centered in the workpiece adapter, an adapter mount configured to be connected to the at least one workpiece adapter, a universal joint assembly arranged between the first drive member and the adapter mount, the universal joint assembly comprising a first fork member coupled to the first drive member, and a second fork member coupled to the adapter mount, one or more adapter rings configured to rotatably support the workpiece, each of the one or more adapter rings including first and second plates that are circular and have a common diameter, at least one middle portion connecting and maintaining a substantially uniform distance between the first and second plates, and a central opening substantially centered on a longitudinal axis of the adapter ring and sized to pass a workpiece therethrough, and one or more roller cradles respectively provided for each of the one or more adapter rings, each of the one or more roller cradles configured with at least two rollers positioned to correspond to an outer diameter of the adapter rings such that the adapter ring is rotatably supported on the rollers.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A workpiece adapter system to support a workpiece rotated by a rotary machine, the system comprising:
   a first drive member having a proximal end configured to be secured in a chuck of the rotary machine;
   at least one workpiece adapter configured to secure at least a portion of an end of the workpiece in a central opening of the workpiece adapter;
   an adapter mount configured to be connected to the at least one workpiece adapter;
   a universal joint assembly arranged between the first drive member and the adapter mount, the universal joint assembly comprising a first fork member coupled to the first drive member, and a second fork member coupled to the adapter mount; and
   one or more adapter rings to rotatably support the workpiece, each of the one or more adapter rings comprising first and second plates that are circular and have a common diameter, at least one middle portion connecting and maintaining a substantially uniform distance between the first and second plates, and a central opening substantially centered on a longitudinal axis of the adapter ring and sized to pass the workpiece therethrough.

2. The system of claim 1, further comprising a mounting plate arranged between the first drive member and the first fork member, such that a distal end of the first drive member is connected to a back side of the mounting plate, and a back surface of the first fork member is connected to a front side of the mounting plate.

3. The system of claim 2, wherein the mounting plate is formed integrally with the first drive member.

4. The system of claim 1, wherein the at least one workpiece adapter comprises a plurality of workpiece adapters respectively configured to secure differently shaped workpieces therein.

5. The system of claim 1, wherein the workpiece adapter includes threaded securing members configured to extend through at least two adjacent sides of the workpiece adapter, such that the securing members may be rotated to provide securing pressure to the workpiece.

6. The system of claim 1, wherein the adapter mount is configured with a plurality of threaded receiving portions, and the at least one workpiece adapter is configured with a corresponding plurality of through holes configured to respectively receive a plurality of threaded securing members to secure the at least one workpiece adapter to the adapter mount.

7. The system of claim 1, further comprising the rotary machine, the rotary machine being configured to be raised or lowered to a desired height to rotate the workpiece.

8. The system of claim 1, wherein the central opening is configured with a plurality of substantially flat sides configured to axially center the workpiece.

9. The system of claim 8, further comprising a plurality of threaded securing members passing respectively through the middle portion at least two adjacent sides of the central opening, and configured to set the workpiece in position.

10. The system of claim 9, further comprising a plurality of securing plates respectively attached to ends of the threaded securing members, the securing plates configured to contact the surface of the workpiece to set the workpiece in position.

11. The system of claim 9, further comprising a plurality of rotating nuts respectively provided to the threaded securing members, and configured to be positioned in open positions in the first and second plates proximate the central opening such that a user can adjust the length of the threaded securing members extending into the central opening.

12. The system of claim 1, further comprising one or more roller cradles respectively provided for each of the one or more adapter rings, each of the one or more roller cradles configured with at least two rollers positioned to correspond to an outer diameter of the adapter rings such that the adapter ring is rotatably supported on the rollers.

13. The system of claim 12, wherein each of the one or more cradles is configured with raised portions configured to maintain the outer diameter of the adapter ring therebetween while the adapter ring rotates on the rollers.

14. The system of claim 13, wherein each of the one or more cradles is configured to be secured to a base rail of the rotary machine system.

15. The system of claim 1, wherein the universal joint assembly is configured as a double u-joint assembly comprising third and fourth fork members between the first and second fork members, and further comprising a second drive member arranged between the third and fourth fork members.

16. The system of claim 1, further comprising a support system configured to be attached to a base rail of the rotary machine system and to support the workpiece being rotated, the support system comprising:
   a base configured to be attached to the base rail;
   a lever member rotatably coupled to the base and having a roller member mounted to a distal end; and
   a variable pressure member connected to the lever member to rotate the lever member such that the roller member is moved to a desired height to support the workpiece during rotation.

17. A rotary machine system to rotate a workpiece during a machining operation, the system comprising:
   a rotary machine having a chuck and configured to be raised and lowered to a desired height;
   a first drive member having a proximal end configured to be secured in the chuck;
   at least one workpiece adapter configured to secure at least a portion of an end of a workpiece in a central opening of the workpiece adapter, the workpiece adapter having a plurality of set screws respectively configured to pass through at least two adjacent sides of the workpiece adapter to set the workpiece so as to be axially centered in the workpiece adapter;
   an adapter mount configured to be connected to the at least one workpiece adapter;
   a universal joint assembly arranged between the first drive member and the adapter mount, the universal joint assembly comprising a first fork member coupled to the first drive member, and a second fork member coupled to the adapter mount;
   one or more adapter rings configured to rotatably support the workpiece, each of the one or more adapter rings comprising:
     first and second plates that are circular and have a common diameter,
     at least one middle portion connecting and maintaining a substantially uniform distance between the first and second plates, and
     a central opening substantially centered on a longitudinal axis of the adapter ring and sized to pass the workpiece therethrough; and
   one or more roller cradles respectively provided for each of the one or more adapter rings, each of the one or more roller cradles configured with at least two rollers positioned to correspond to an outer diameter of the adapter rings such that the adapter ring is rotatably supported on the rollers.

\* \* \* \* \*